Oct. 6, 1942.    P. JEPSON    2,297,770
COTTER PIN
Filed March 7, 1941
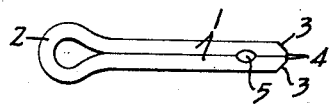
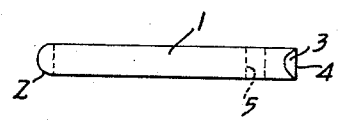
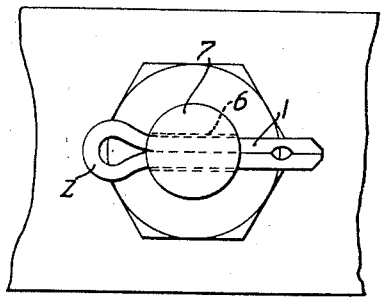
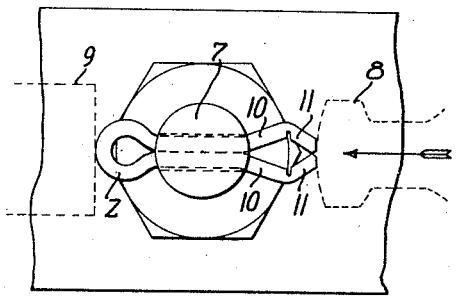
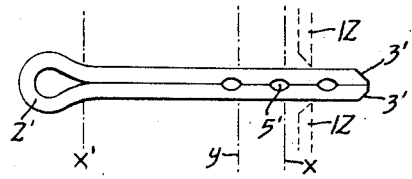
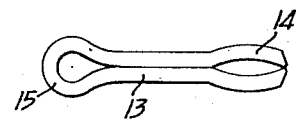
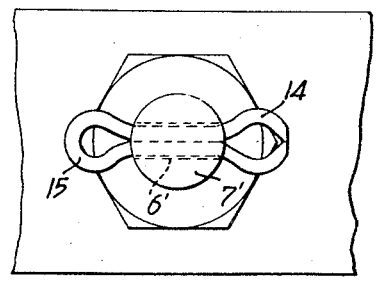
INVENTOR
PERCY JEPSON
BY *Boyken & Mohler*
ATTORNEYS Patented Oct. 6, 1942

2,297,770

UNITED STATES PATENT OFFICE 2,297,770

COTTER PIN

Percy Jepson, Oakland, Calif.

Application March 7, 1941, Serial No. 382,229

4 Claims. (Cl. 85—8.5)

This invention relates to cotter pins, and has for its objects, a cotter pin that is cheap to make, easy to insert in the hole in a bolt, rod, etc., and which pin is quickly and easily locked against displacement or withdrawal from its retaining position without requiring special tools, wedges, or other elements, but which pin may be quickly released from said retaining position, when desired, by a simple operation. Other advantages are the provision of a cotter pin, which, when in retaining position and secured against withdrawal, does not have the usual sharp, spaced, projecting ends that are likely to cause accidental injury to clothing and flesh, but which ends are in close engagement, and the legs of the pin are so arranged as to tend to direct therepast any object that may engage the projecting portion of the legs and said ends without injury thereto. A still further object is cotter pin construction in which a single length pin may be readily adapted for use in a bolt or the like of more than one size while preserving the advantages enumerated in the foregoing objects. Other objects and advantages will appear in the drawing and specification annexed hereto.

In the drawing, Fig. 1 is a side view of my improved cotter pin before use.

Fig. 2 is a side view of the pin of Fig. 1 as seen at right angles to the view of Fig. 1.

Fig. 3 is an end view of a bolt with the pin of Fig. 1 in an opening in said bolt outwardly of the nut thereon.

Fig. 4 is a view similar to that of Fig. 3 with the pin locked against withdrawal.

Fig. 5 is a side view of a pin incorporating the features of the pin of Fig. 1 but which pin is constructed so as to be capable of use in either a relatively thick or thin bolt or a bolt of intermediate size, while preserving the advantages of the invention.

Fig. 6 is a side view of a slightly modified form of the invention, and Fig. 7, is an end view of a bolt with the cotter pin of Fig. 6 locked or secured in a hole in said bolt.

In detail, the pin shown in Fig. 1 may be formed from a length of wire or the like having substantially the inherent rigidity and resiliency of the stock used for conventional cotter pins. The said length of wire is doubled on itself to provide a pair of parallel legs 1 that are integrally connected at one of their ends by an eye 2. The said legs are close together and their free ends are similarly beveled at their outer edges at two opposite sides of the central axis of the pin. These beveled surfaces are indicated by the numeral 3, and the outer ends 4 of said legs 1 at the adjacent sides thereof terminate even with each other. The free end of each leg 1 is thus seen to be generally the shape of the outer end of a singly beveled chisel, with the bevel surfaces 3 of the pair of free ends facing divergently outwardly. The axially outermost ends 4 of the legs may be slightly blunted so as to provide flat hitting surfaces adapted to be simultaneously struck by a hammer or other suitable striking instrument.

The wire used to form the cotter pin is preferably half-round in cross-section, and when bent to form the legs 1, the flat sides of the portions of said legs are together.

Adjacent the free ends of legs 1, but spaced a predetermined distance therefrom, the said legs are formed with opposedly facing grooves 5, which grooves extend across the adjacent flat sides of said legs at right angles to the lengths of the latter. These grooves 5 are preferably of equal depth, and which depth is about half the thickness of each leg. The width of each groove 5 may be equal to, or slightly greater than the depth, for a reason later to be given.

In operation, the cotter pin, as described, is inserted axially into a hole 6 that extends transversely through a bolt 7, or the like, so that the eye 2, at its side adjacent its juncture with legs 1, engages the edge of the hole 6 at one side of the bolt 7, as indicated in Fig. 3.

The length of the pin is such that the end portions of legs 1 having grooves 5 formed therein, will project outwardly of the side of the bolt opposite eye 2, a distance approximately double the distance between the said grooves and the free ends of legs 1. The diameter of the pin taken through the legs, is such that the legs will slide readily into the hole in the bolt without binding, since the correct sized cotter pin will obviously be selected for the particular bolt or other apertured member with which the pin is to be used.

After the cotter pin is in the position indicated in Fig. 3 and as described in the preceding paragraphs, it is seen that the force of a blow delivered against ends 4 of legs 1 by a hammer 8, while eye 2 is supported against any suitable, relatively firm member 9, will result in opposite outward buckling of the portions of legs 1 that project outwardly of bolt 7, as indicated in Fig. 4. In this latter figure the hammer or striking member, and the eye supporting member that holds the pin against axial movement out of hole 6 when the blow is delivered to ends 4, are indicated in dash lines.

The reason for the legs buckling outwardly in the manner shown in Fig. 4 is clear. The direct force of the blow by hammer 8 axially of the legs 1 is transmitted axially of said legs along their adjacent sides to the points where grooves 5 cut across said adjacent sides, and the straight line of said force is deflected, as it were, outwardly to the weakest portions of the legs, which portions are at said grooves. Thus the localizing of the blow at ends 4, together with the positions of the grooves, cannot fail to deform the legs equally in the manner shown in Fig. 4, when the pin is held at the eye end against substantial axial movement in hole 6, and the legs are held substantially together in said hole at their end portions adjacent said eye.

This opposite outward buckling of the legs at opposite sides of grooves 5, tends to draw the eye 2 into hole 6 by reason of the angular engagement of leg portions 10 that lie between grooves 5 and bolt 7, and the end of hole 6 from which said portions project. This tendency to draw the eye 2 into hole 6 results in the cotter pin being drawn tight in the hole. The eye 2 is tight against the bolt at one end of hole 6 and portions 10 of the legs are tight against the bolt at the opposite end of said hole.

The width of grooves 5 axially of legs 1 is such that the opposite sides of each groove will not engage each other when legs 1 are outwardly buckled as shown in Fig. 4, until the portions 10 extend with sufficient angularity to each other to positively secure the pin in hole 6 against accidental removal therefrom.

The outer leg portions 11 that are axially outwardly of grooves 5 toward the free ends of the legs 1, extend convergently from said grooves when the legs have been buckled as shown in Fig. 4, and the free ends of said legs are in tight engagement with each other. When the portions 10, 11 of the legs are bent as shown in Fig. 4, it will be seen that the portions 11 function to resist any tendency of portions 10 to be brought together, and the engaging outer ends of portions 11 vertically come together at a single point, thus vertically presenting only one projecting end to the cotter pin, instead of the two spaced ends found in a conventional cotter pin. Since the bevel surfaces 3 at the outer ends of portions 11 face axially outwardly of the cotter pin, when said portions are bent to angularly extending relation, there is no sharp point at the outermost engaging ends of said portions 11, so there is no substantial danger from the said ends engaging the clothing of a person or cotton waste, or in doing serious injury to a person.

To release the cotter pin shown in Fig. 4 from the hole 6, it is only necessary to press the legs together by pressure applied at the bends adjacent grooves 5. This can easily be done, and one of the simplest ways is by use of ordinary pliers or pincers. After the leg portions 10, 11 are straightened, the pin will be readily withdrawn from hole 6.

In Fig. 5 I show a cotter pin having a plurality of pairs of opposedly disposed grooves 5' at equally spaced points axially of said legs. The spacing between such pairs of grooves is substantially equal to the distance between grooves 5 of Fig. 1 and the outer ends 4 of the legs, although this spacing may vary according to the thickness and length of the cotter pin. In the event the pin of Fig. 5 is to be used in a bolt of relatively large diameter, such as where the side of the bolt adjacent the outer ends of the legs is at about line X when the opposite side is at line X' and against eye 2', the pin, as shown in Fig. 5 is used without alteration, and may be locked in the hole in such bolt in exactly the same manner described for the pin in Figs. 3, 4. No undesired buckling of the legs can take place, since the pairs of grooves 5', with the exception of the outermost pair, are in hole in the bolt.

However, should the bolt be of a lesser diameter, and the side adjacent the outer ends of the legs be at about line Y, then by merely clipping off the legs by the jaws 12 of a conventional pair of clippers at the outermost pair of grooves the cotter pin will lock in the same manner as the pin of Figs. 3, 4, when the outer ends of the legs are struck as explained for Fig. 4. The jaws of conventional clippers will automatically bevel surfaces similar to those shown at 3 in Fig. 1.

In Fig. 6 I show a cotter pin in which the legs 13 are slightly bowed oppositely outwardly adjacent their outermost free ends, as indicated at 14. The terminating free ends of said legs are bevelled in substantially the same manner as in the pin of Fig. 1, whereby the ends of the legs at their adjacent sides will receive the full force of a blow delivered against said latter ends.

The maximum diameter of the cotter pin across the portions 14 is such that the pin will slip into a hole, such as hole 6' in bolt 7' (Fig. 7), and even if slight compression of the bowed portions takes place during said insertion, the inherent resiliency of these portions will cause them to spring out again as soon as the bolt is past said portions and engages eye 15. After the said pin is in place, a blow on the free ends while a backing member holds eye 15 relatively stationary will result in the bow of portions 14 becoming more pronounced when the outwardly projecting ends of the legs are substantially of the same appearance as in Fig. 4. In Fig. 7 the pin of Fig. 6 is shown locked on bolt 7'. The concavity of adjacent sides of portions 14 in Fig. 6 functions in substantially the same manner and for substantially the same purpose as the grooves 5 in the pin illustrated in Figs. 1 to 4. It is highly important, however, that the outermost ends of the free legs be relieved, as by bevels or the like, so as to localize the force of any blow axially of the pin to the portions of said ends adjacent the line of separation between said legs. While this construction is not always vital to the pin shown in Fig. 6 to cause the legs to buckle at bowed portions 14, it is essential to producing a relatively square axially facing outer end of the pin after the desired distortion has occurred, as seen in Fig. 7.

Having described my invention, I claim:

1. A cotter pin having a pair of parallel legs substantially in engagement with each other; each of said legs being continuous, and said legs being of substantially the same length and terminating even with each other at their opposite ends; a head connecting said legs together at one of their ends, and their other ends being free from securement to each other; a pair of opposedly facing notches being formed in the adjacent sides of said legs at a point intermediate their opposite ends; the said other free ends of said pair of legs being beveled at the oppositely outwardly facing sides thereof whereby said legs will bow oppositely outwardly at said notches when said other free ends are struck axially of said legs and while said head is held to resist bodily movement of said legs and head upon said other ends being so struck.

2. A cotter pin having a pair of parallel legs substantially in engagement with each other; each of said legs being continuous, and said legs being of substantially the same length and terminating substantially even with each other at their opposite ends; a head connecting said legs together at one of their ends and said legs being free from securement to each other at their other ends; a restricted portion of the opposed surfaces of said legs intermediate their opposite ends being spaced apart whereby said legs will bow oppositely outwardly at said spaced opposed surfaces when said free other ends are struck axially of said legs and while said head is held to resist bodily movement of said legs and head axially of said legs; said free other ends of said pair of legs being beveled at the oppositely outwardly facing sides thereof to restrict the force of a blow axially delivered against said other ends of said legs along the opposed sides of said legs in direction longitudinally of said legs.

3. A cotter pin having a pair of parallel legs substantially in engagement with each other; each of said legs being continuous, and said legs being of substantially the same length and terminating substantially even with each other at their opposite ends; a head integral with said legs connecting them together at one of their ends and their other ends being free from securement to each other; said legs being of substantially half-round wire with their flat sides in opposed relation; a pair of oppositely facing recesses being formed in the adjacent flat sides of said legs at a point spaced from said other free ends but nearer to said latter ends than to said head; the said other free ends of said pair of legs being beveled at the oppositely outwardly facing sides thereof whereby said legs will bow oppositely outwardly at said recesses when said other free ends are struck axially of said legs and while said head is held to resist bodily movement of said legs and head in direction axially of said legs.

4. The combination with a bolt or the like having a cotter pin opening extending therethrough of a cotter pin having a pair of legs of equal lengths extending through said opening; a head integral with said legs connecting them at one of their ends, and said head abutting said bolt at one end of said opening; said legs respectively, having end portions opposite said head projecting from the opposite end of said opening; said end portions extending divergently from said opposite end of said opening outwardly therefrom to points about midway between said opposite end of said opening and the outermost ends of said portions and extending convergently from said points to engaging relation at their outermost ends; the distance between said portions at said points being substantially greater than the diameter of said opening whereby said pin is locked in said opening against removal therefrom but may be removed upon forcing the said portions at said points toward each other.

PERCY JEPSON.